United States Patent
Yang et al.

(10) Patent No.: US 7,463,754 B2
(45) Date of Patent: *Dec. 9, 2008

(54) ADAPTIVE PROBABILISTIC VISUAL TRACKING WITH INCREMENTAL SUBSPACE UPDATE

(75) Inventors: Ming-Hsuan Yang, Mountain View, CA (US); Jongwoo Lim, La Jolla, CA (US); David Ross, Toronto (CA); Ruei-Sung Lin, Urbana, IL (US)

(73) Assignee: Honda Motor Co., Tokyo (JP)

( * ) Notice: Subject to any disclaimer, the term of this patent is extended or adjusted under 35 U.S.C. 154(b) by 828 days.

This patent is subject to a terminal disclaimer.

(21) Appl. No.: 10/989,966

(22) Filed: Nov. 15, 2004

(65) Prior Publication Data

US 2005/0175219 A1 Aug. 11, 2005

Related U.S. Application Data

(60) Provisional application No. 60/520,005, filed on Nov. 13, 2003.

(51) Int. Cl.
*G06K 9/00* (2006.01)
(52) U.S. Cl. ..................... 382/103; 348/169
(58) Field of Classification Search ............. 382/103, 382/107, 159; 348/135, 169
See application file for complete search history.

(56) References Cited

U.S. PATENT DOCUMENTS

| | | | |
|---|---|---|---|
| 5,416,899 A | 5/1995 | Poggio et al. | 395/152 |
| 5,680,531 A | 10/1997 | Litwinowicz et al. | 395/173 |
| 5,960,097 A | 9/1999 | Pfeiffer et al. | 382/103 |
| 6,047,078 A | 4/2000 | Kang | 382/107 |
| 6,226,388 B1 | 5/2001 | Qian et al. | 382/103 |
| 6,236,736 B1 | 5/2001 | Crabtree et al. | 382/103 |
| 6,295,367 B1 | 9/2001 | Crabtree et al. | 382/103 |
| 6,337,927 B1 | 1/2002 | Elad et al. | 382/225 |
| 6,346,124 B1 | 2/2002 | Geiser et al. | 660/450 |

(Continued)

FOREIGN PATENT DOCUMENTS

WO    WO 00/48509 A1    8/2000

OTHER PUBLICATIONS

Black, Michael J. et al., "EigenTracking: Robust Matching and Tracking of Articulated Objects Using a View-Based Representation," International Journal of Compuber Vision, 1998, pp. 63-84, vol. 26, No. 1.

Collins, R.T. et al., "On-Line Selection of Discriminative Tracking Features," Carnegie Mellon University, 2003, pp. 1-14.

International Search Report and Written Opinion, PCT/US05/24582, Feb. 9, 2006, 8 pages.

(Continued)

*Primary Examiner*—Andrew W Johns
(74) *Attorney, Agent, or Firm*—Fenwick & West LLP; Mark Duell

(57) ABSTRACT

A system and a method are disclosed for adaptive probabilistic tracking of an object within a motion video. The method utilizes a time-varying Eigenbasis and dynamic, observation and inference models. The Eigenbasis serves as a model of the target object. The dynamic model represents the motion of the object and defines possible locations of the target based upon previous locations. The observation model provides a measure of the distance of an observation of the object relative to the current Eigenbasis. The inference model predicts the most likely location of the object based upon past and present observations. The method is effective with or without training samples. A computer-based system provides a means for implementing the method. The effectiveness of the system and method are demonstrated through simulation.

21 Claims, 4 Drawing Sheets

Figure 2

U.S. PATENT DOCUMENTS

| | | |
|---|---|---|
| 6,363,173 B1 | 3/2002 | Stentz et al. ............... 382/195 |
| RE37,668 E | 4/2002 | Etoh ......................... 382/251 |
| 6,400,831 B2 | 6/2002 | Lee et al. ................... 382/103 |
| 6,539,288 B2 | 3/2003 | Ishida et al. ................. 701/1 |
| 6,580,810 B1 | 6/2003 | Yang et al. ................. 382/103 |
| 6,683,968 B1 | 1/2004 | Paviovic et al. ............. 382/103 |
| 6,757,423 B1 | 6/2004 | Amini ........................ 382/154 |
| 6,870,945 B2 | 3/2005 | Schoepflin et al. .......... 382/103 |
| 6,999,600 B2 | 2/2006 | Venetianer et al. .......... 382/103 |
| 7,003,134 B1 | 2/2006 | Covell et al. ................ 382/103 |
| 2001/0048753 A1 | 12/2001 | Lee et al. ................... 382/103 |
| 2004/0208341 A1 | 10/2004 | Zhou et al. ................. 382/103 |

OTHER PUBLICATIONS

"Pose Invariant Affect Analysis Using Thin-Plate Splines," To appear Int. Conference on Pattern Recognition, Cambridge, UK, Aug. 2004, [online] [Retrieved on Oct. 9, 2006] Retrieved from the Internet<URL:http://cvrr.ucsd.edu/publications/2004/RAAS-ICPR2004.pdf>.

Tipping, Michael E. et al., "Probabilistic Principal Component Analysis," Journal of the Royal Statistical Society, Series B, Sep. 27, 1998, pp. 611-622, vol. 61, part 3.

PCT International Search Report and Written Opinion, PCT/US06/23350, Sep. 25, 2007, 8 pages.

International Search Report and Written Opinion, PCT/US04/38189, Mar. 2, 2005.

ADAPTIVE PROBABILISTIC VISUAL TRACKING WITH INCREMENTAL SUBSPACE UPDATE

CROSS REFERENCE TO RELATED APPLICATIONS

This application claims priority under 35 USC § 119(e) to U.S. Provisional Patent Application No. 60/520,005, filed Nov. 13, 2003 titled "Adaptive Probabilistic Visual Tracking With Incremental Subspace Update", the content of which is incorporated by reference herein in its entirety.

This application is related to U.S. patent application Ser. No. 10/703,294, filed on Nov. 6, 2003, entitled "Clustering Appearances of Objects Under Varying Illumination Conditions," the content of which is hereby incorporated by reference by reference herein in its entirety.

This application is related to U.S. patent application Ser. No. 10/858,878, filed on Jun. 1, 2004, entitled "Method, Apparatus and Program for Detecting an Object," the content of which is hereby incorporated by reference herein in its entirety.

FIELD OF THE INVENTION

The present invention generally relates to the field of computer vision, and more specifically, to visual tracking of objects within a motion video.

BACKGROUND OF THE INVENTION

From the photography aficionado type digital cameras to the high-end computer vision systems, digital imaging is a fast growing technology that is becoming an integral part of everyday life. In its most basic definition, a digital image is a computer readable representation of an image of a subject taken by a digital imaging device, e.g. a camera, video camera, or the like. A computer readable representation, or digital image, typically includes a number of picture elements, or pixels, arranged in an image file or document according to one of many available graphic formats. For example, some graphic file formats include, without limitation, bitmap, Graphics Interchange Format (GIF), Joint Photographic Experts Group (JPEG) format, and the like. A subject is anything that can be imaged, i.e., photographed, videotaped, or the like. In general, a subject may be an object or part thereof, a person or a part thereof, a scenic view, an animal, or the like. An image of a subject typically comprises viewing conditions that, to some extent, make the image unique. In imaging, viewing conditions typically refer to the relative orientation between the camera and the object (i.e., the pose), and the external illumination under which the images are acquired.

Motion video is generally captured as a series of still images, or frames. Of particular interest and utility is the ability to track the location of an object of interest within the series of successive frames comprising a motion video, a concept generally referred to as visual tracking. Example applications include without limitation intelligence gathering, whereby the location and description of the target object over time are of interest, and robotics, whereby a machine may be directed to perform certain actions based upon the perceived location of a target object.

The non-stationary aspects of the target object and the background within the overall image challenge the design of visual tracking methods. Conventional algorithms may be able to track objects, either previously viewed or not, over short spans of time and in well-controlled environments. However, these algorithms usually fail to observe the object's motion or eventually encounter significant drifts, either due to drastic change in the object's appearance or large lighting variation. Although such situations have been ameliorated, most visual tracking algorithms typically operate on the premise that the target object does not change drastically over time. Consequently, these algorithms initially build static models of the target object, without accounting for changes in appearance, e.g., large variation in pose or facial expression, or in the surroundings, e.g., lighting variation. Such an approach is prone to instability.

From the above, there is a need for an improved, robust method for visual tracking that learns and adapts to intrinsic changes, e.g., in pose or shape variation of the target object itself, as well as to extrinsic changes, e.g., in camera orientation, illumination or background.

SUMMARY OF THE INVENTION

The present invention provides a method and apparatus for visual tracking that incrementally updates a description of the target object. According to the iterative tracking algorithm, an Eigenbasis represents the object being tracked. At successive frames, possible object locations near a predicted position are postulated according to a dynamic model. An observation model then provides a maximum a posteriori estimate of object location, whereby the possible location that can best be approximated by the current Eigenbasis is chosen. An inference model applies the dynamic and observation models over multiple past frames to predict the next location of the target object. Finally, the Eigenbasis is updated to account for changes in appearance of the target object.

According to one embodiment of the invention, the dynamic model represents the incremental motion of the target object using an affine warping model. This model represents linear translation, rotation and scaling as a function of each observed frame and the current target object location, according to multiple normal distributions. The observation model utilizes a probabilistic principal components distribution to evaluate the probability that the currently observed image was generated by the current Eigenbasis. A description of this is in M. E. Tipping and C. M. Bishop "Probabilistic principal component analysis," Journal of the Royal Statistical Society, Series B 61 (1999), which is incorporated by reference herein in its entirety. The inference model utilizes a simple sampling method that operates on successive frame pairs to efficiently and effectively infer the most likely location of the target object. The Eigenbasis is updated according to application of the sequential Karhunen-Loeve algorithm, and the Eigenbasis may be optionally initialized when training information is available.

A second embodiment extends the first in that the sequential inference model operates over a sliding window comprising a selectable number of successive frames. The dynamic model represents six parameters, including those discussed above plus aspect ratio and skew direction. The observation model is extended to accommodate the orthonormal components of the distance between observations and the Eigenbasis. Finally, the Eigenbasis model and update algorithm are extended to account for variations in the sample mean while providing an exact solution, and no initialization of the Eigenbasis is necessary.

According to another embodiment of the present invention, a system is provided that includes a computer system comprising an input device to receive the digital images, a storage or memory module for storing the set of digital images, and a processor for implementing identity-based visual tracking algorithms.

The embodiments of the invention thus discussed facilitate efficient computation, robustness and stability. Furthermore, they provide object recognition in addition to tracking. Experimentation demonstrates that the method of the invention is able to track objects well in real time under large lighting, pose and scale variation.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The invention has other advantages and features which will be more readily apparent from the following detailed description of the invention and the appended claims, when taken in conjunction with the accompanying drawings, in which:

FIG. ("FIG.") 1 is a schematic illustration of the visual tracking concept.

DETAILED DESCRIPTION OF THE PREFERRED EMBODIMENTS

The Figures ("FIG.") and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1:
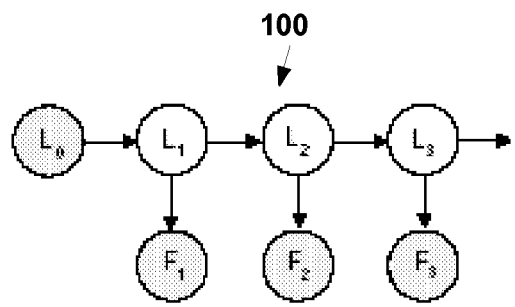

The object tracking problem is illustrated schematically in FIG. 1. At each time step t an image region or frame $F_t$ is observed in sequence, and the location of the target object, $L_t$, is treated as an unobserved or hidden state variable. The motion of the object from one frame to the next is modeled based upon the probability of the object appearing at $L_t$, given that it was just at $L_{t-1}$. In other words, the model represents possible locations of the object at time t, as determined prior to observing the current image frame. The likelihood that the object is located at a particular possible position is then determined according to a probability distribution. The goal is to determine the most probable a posteriori object location.

Figure 2:
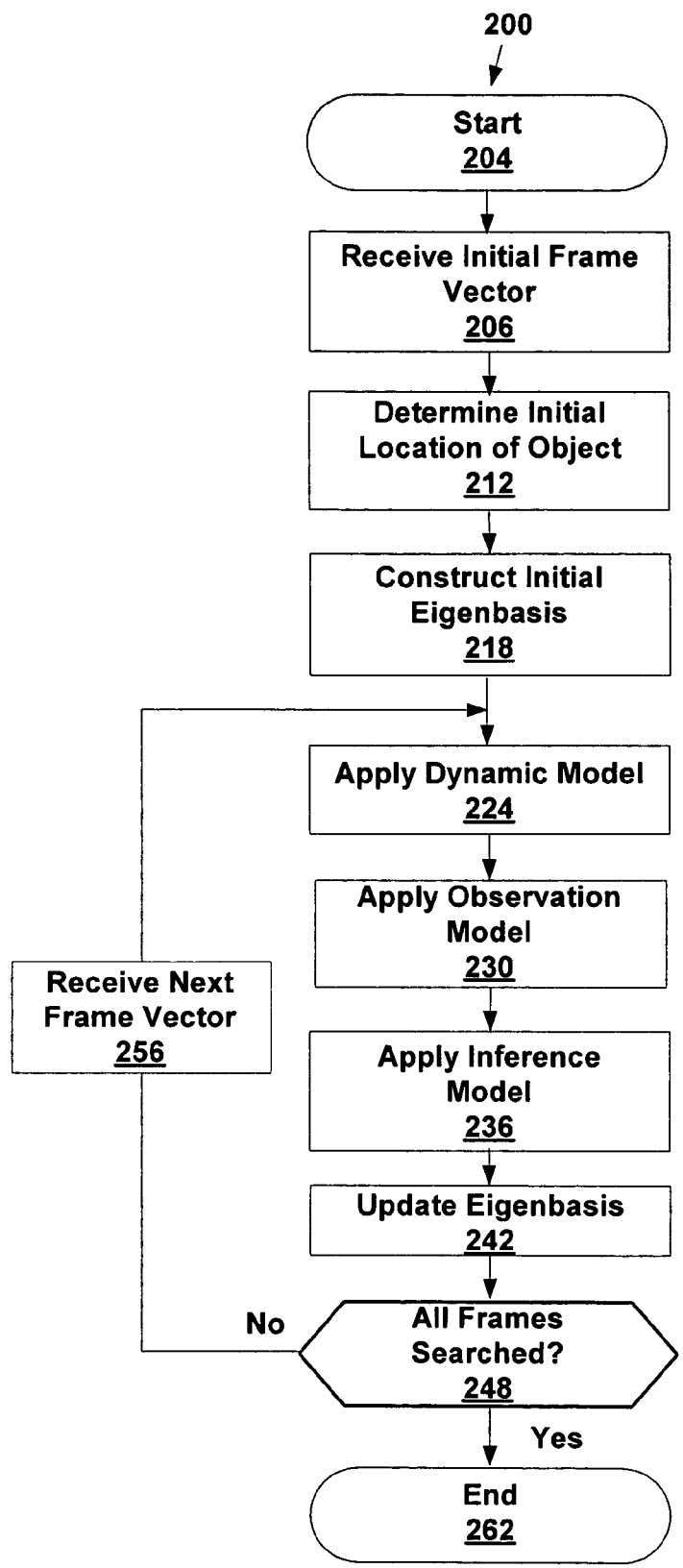
FIG. 2 shows an overall algorithm for visual tracking.

Referring now to FIG. 2, a first embodiment of the invention is depicted. An initial frame vector is received in step 206. This frame vector includes one element per pixel. Each pixel comprises a description of brightness, color etc. In step 212, the initial location of the target object is determined. This may be accomplished either manually or through automatic means.

An example of automatic object location determination is face detection. One embodiment of face detection is illustrated in patent application Ser. No. 10/858,878, Method, Apparatus and Program for Detecting an Object, which is incorporated by reference herein in its entirety. Such an embodiment informs the tracking method of an object or area of interest within an image.

In step 218, an initial Eigenbasis is optionally constructed. The Eigenbasis is a mathematically compact representation of the class of objects that includes the target object. For example, for a set of images of a particular human face captured under different illumination conditions, a polyhedral cone may be defined by a set of lines, or eigenvectors, in a multidimensional space $R^S$, where S is the number of pixels in each image. The cone then bounds the set of vectors corresponding to that human's face under all possible or expected illumination conditions. An Eigenbasis representing the cone may in turn be defined within the subspace $R^M$, where M<S. By defining multiple such subspaces corresponding to different human subjects, and by computing the respective distances to an image including an unidentified subject, the identity of the subject may be efficiently determined. The same concepts apply generally to other classes of objects of interest, including, e.g., animals, automobiles, geometric shapes etc.

Figure 3:
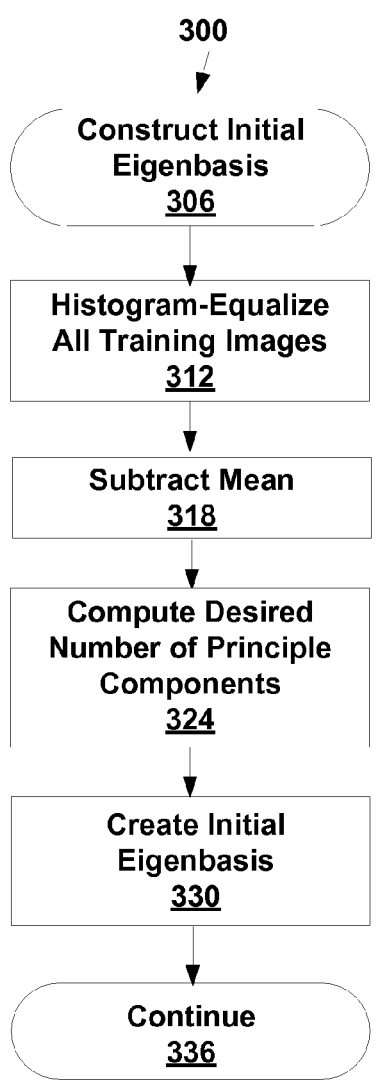
FIG. 3 shows an algorithm for initial Eigenbasis construction according to one embodiment of the present invention.

FIG. 3 illustrates initialization of the Eigenbasis from a set of training images of the object of interest or of similar objects. While such initialization may accelerate convergence of the Eigenbasis, it may be eliminated for simplicity, or where training images are unavailable. In step 312, all training images are histogram-equalized. In step 318, the mean is subtracted from the data. The desired principle components are computed in step 324. Finally, the Eigenbasis is created in step 330.

Figure 4:
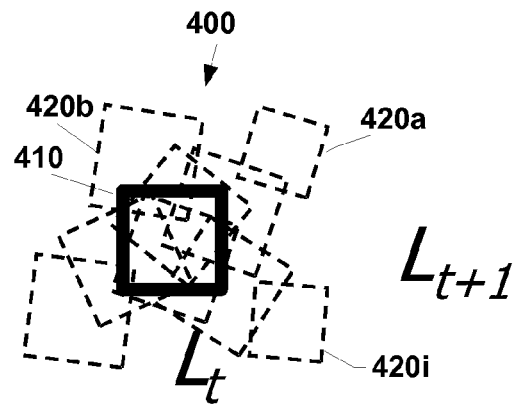
FIG. 4 illustrates a concept of the dynamic model according to one embodiment of the present invention.

Returning to FIG. 2, in step 224, a dynamic model is employed to predict possible locations of the target object in the next frame, $L_{t+1}$, based upon the location within the current frame, $L_t$, according to a distribution $p(L_t|L_{t-1})$. This is shown conceptually in FIG. 4, including location in the current frame 410 and possible locations in the next frame 420($i$). In other words, a probability distribution provided by the dynamic model encodes beliefs about where the target object might be at time t, prior to observing the respective frame and image region.

According to dynamic model 224, $L_t$, the location of the target object at time t, is represented using the four parameters of a similarity transformation, i.e., $x_t$ and $y_t$ for translation in x and y, $r_t$ for rotation, and $s_t$ for scaling. This transformation warps the image, placing the target window, corresponding to the boundary of the object being tracked, in a rectangle centered at coordinates (0,0), with the appropriate width and height. This warping operates as a function of an image region F and the object location L, i.e., w(F,L).

The initialization of dynamic model 224 assumes that each parameter is independently distributed, according to a normal distribution, around a predetermined location $L_0$. Specifically $$p(L_1|L_0)=N(x_1;x_0,\sigma_x^2)N(y_1;y_0,\sigma_y^2)N(r_1;r_0,\sigma_r^2)N(s_1;s_0,\sigma_s^2) \quad (1)$$

where $N(z;\mu,\sigma^2)$ denotes evaluation of the normal distribution function for data point z, with mean $\mu$ and variance $\sigma^2$.

Figure 5:
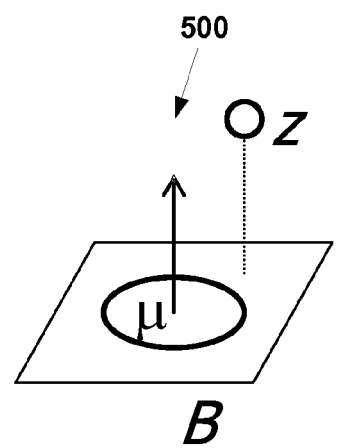
FIG. 5 illustrates a concept of the distance-to-subspace observation model according to one embodiment of the present invention.

Returning to FIG. 2, in step 230, an image observation model is next applied. Since the Eigenbasis is used to model the target object's appearance, the observation model evaluates the probability that the currently observed image was generated by the current Eigenbasis. A probabilistic principal components distribution (also known as sensible PCA) may serve as a basis for this model. A description of this is in S. Roweis, "EM algorithms for PCA and SPCA," Advances in Neural Information Processing Systems, M. I. Jordan, M. J. Kearns and S. A. Solla eds., 10 MIT Press (1997), which is incorporated by reference herein in its entirety. Given a location $L_t$, this model assumes that the observed image region was generated by sampling an appearance of the object from the Eigenbasis and inserting it at $L_t$. Following Roweis, and as illustrated conceptually in FIG. 5, the probability of observing a datum z given the Eigenbasis B and mean $\mu$ is $N(z;\mu, BB^T+\epsilon I)$, where the $\epsilon I$ term corresponds to the covariance of additive Gaussian noise present in the observation process. Such noise might arise, for example, from data quantization, errors in the video sensor or thermal effects. In the limit as $\epsilon \to 0$, $N(z;\mu,BB^T+\epsilon I)$ is proportional to the negative exponential of the squared distance between z and the linear subspace B, $|(z-\mu)-BB^T(z-\mu)|^2$.

Again referring to FIG. 2, an inference model 236 is next applied to predict the location of the target object. According to the probabilistic model of FIG. 1, since $L_t$ is never directly observed, full Bayesian inference would require computation of the distribution $P(L_t|F_t, F_{t-1}, \ldots, F_t, L_0)$ at each time step. Unfortunately, this distribution is infeasible to compute in closed form. Instead, it is approximated using a normal distribution of the same form as that in Equation 1 around the maximum $I_t^*$ of $p(L_t|F_t,I_{t-1}^*)$ Using Bayes' rule to integrate the observation with the prior belief yields the conclusion that the most probable a posteriori object location is at the maximum $I_t^*$ of $p(L_t|F_t, L_{t-1}) \propto p(F_t|L_t)p(L_t|L_{t-1})$.

An approximation to $I_t^*$ can be efficiently and effectively computed using a simple sampling method. Specifically, a number of sample locations are drawn from the prior $p(L_t|I_{t-1}^*)$. For each sample $I_s$ the posterior probability $p_s=p(I_s|F_t, I_{t-1}^*)$ is computed. $p_s$ is simply the likelihood of $I_s$ under the probabilistic PCA distribution, times the probability with which $I_s$ was sampled, disregarding the normalization factor which is constant across all samples. Finally the sample with the largest posterior probability is selected to be the approximate $I_t^*$, i.e., $$I_t^*=\mathrm{argmax}_{I_s} p(I_s|F_t,I_{t-1}^*) \quad (2)$$

This method has the advantageous property that a single parameter, namely the number of samples, can be used to control the tradeoff between speed and tracking accuracy.

To allow for incremental updates to the target object model, the probability distribution of observations is not fixed over time. Rather, recent observations are used to update this distribution, albeit in a non-Bayesian fashion. Given an initial Eigenbasis $B_{t-1}$, and a new appearance $w_{t-1}=w(F_{t-1},I_{t-1}^*)$ a new basis $B_t$ is computed using the sequential Karhunen-Loeve (K-L) algorithm, as described below. A description of this is in A. Levy and M. Lindenbaum, "Sequential Karhunen-Loeve basis extraction and its application to images," IEEE Transactions on Image Processing 9 (2000), which is incorporated by reference herein it its entirety. The new basis is used when calculating $p(F_t|L_t)$. Alternately, the mean of the probabilistic PCA model can be updated online, as described below.

The sampling method thus described is flexible and can be applied to automatically localize targets in the first frame, though manual initialization or sophisticated object detection algorithms are also applicable. By specifying a broad prior (e.g., a Gaussian distribution with larger covariance matrix or larger standard deviation) over the entire image, and by. drawing enough samples, the target can be located by the maximum response using the current distribution and the initial Eigenbasis.

Since the appearance of the target object or its illumination may be time varying, and since an Eigenbasis is used for object representation, it is important to continually update the Eigenbasis from the time-varying covariance matrix. This is represented by step 242 in FIG. 2. This problem has been studied in the signal processing community, where several computationally efficient techniques have been proposed in the form of recursive algorithms. A description of this is in B. Champagne and Q. G. Liu, "Plane rotation-based EVD updating schemes for efficient subspace tracking," IEEE Transactions on Signal Processing 46 (1998), which is incorporated by reference herein it its entirety. In this embodiment, a variant of the efficient sequential Karhunen-Loeve algorithm is utilized to update the Eigenbasis, as explained in Levy and Lindenbaum, which was cited above. This in turn is based on the classic R-SVD method. A description of this is in G. H. Golub and C. F. Van Loan, "Matrix Computations," The Johns Hopkins University Press (1996), which is incorporated by reference herein in its entirety.

Let $X=U\Sigma V^T$ be the SVD of a data M×P matrix X where each column vector is an observation (e.g., image). The R-SVD algorithm provides an efficient way to carry out the SVD of a larger matrix $X^*=(X|E)$, where E is a M×K matrix consisting of K additional observations (e.g., incoming images) as follows.

1. Use an orthonormaliztion process (e.g., Gram-Schmidt algorithm) on (U|E) to obtain an orthonormal matrix $U'=(U|\tilde{E})$.
2. Form the matrix $$V' = \begin{pmatrix} V & 0 \\ 0 & I_K \end{pmatrix}$$

where $I_K$ is a K dimensional identity matrix.

3.

$$\begin{aligned} \text{Let } \Sigma' &= U'^T X^* V' \\ &= \begin{pmatrix} U^T \\ \tilde{E}^T \end{pmatrix} (X \mid E) \begin{pmatrix} V & 0 \\ 0 & I_K \end{pmatrix} \\ &= \begin{pmatrix} U^T X V & U^T E \\ \tilde{E}^T X V & \tilde{E}^T E \end{pmatrix} \\ &= \begin{pmatrix} \Sigma & U^T E \\ 0 & \tilde{E}^T E \end{pmatrix} \end{aligned}$$

since $\Sigma=U^T XV$ and $\tilde{E}^T XV=0$. Note that the K rightmost columns of $\Sigma'$ are the new image vectors, represented in the updated orthonormal basis spanned by the columns of U'.

4. Compute the SVD of $\Sigma'=\tilde{U}\tilde{\Sigma}\tilde{V}^T$ and the SVD of X* as $$X^*=U'(\tilde{U}\tilde{\Sigma}\tilde{V}^T)V'^T=(U'\tilde{U})\Sigma(\tilde{V}^TV'^T) \quad (3)$$

By exploiting the orthonormal properties and block structure, the SVD computation of X* can be efficiently carried by using the smaller matrices, U', V', Σ' and the SVD of smaller matrix Σ'.

Based on the R-SVD method, the sequential Karhunen-Loeve algorithm further exploits the low dimensional subspace approximation and only retains a small number of eigenvectors as new data arrive, as explained in Levy and Lindenbaum, which was cited above.

Referring again to FIG. 2, following the first Eigenbasis update, the loop control comprising steps 248 and 256 causes dynamic model 224, observation model 230, inference model 236 and Eigenbasis update 242 to be applied to successive frames until the last frame has been processed.

This embodiment is flexible in that it can be carried out with or without constructing an initial Eigenbasis as per step 212. For the case where training images of the object are available and well cropped, an Eigenbasis can be constructed that is useful at the onset of tracking. However, since training images may be unavailable, the algorithm can gradually construct and update an Eigenbasis from the incoming images if the target object is localized in the first frame.

According to a second embodiment of the visual tracking algorithm, no training images of the target object are required prior to the start of tracking. That is, after target region initialization, the method learns a low dimensional eigenspace representation online and incrementally updates it. In addition, the method incorporates a particle filter so that the sample distributions are propagated over time. Based on the Eigenspace model with updates, an effective likelihood estimation function is developed. Also, the R-SVD algorithm updates both the sample mean and Eigenbasis as new data arrive. Finally, the present method utilizes a robust error norm for likelihood estimation in the presence of noisy data or partial occlusions, thereby rendering accurate and robust tracking results.

Referring again to FIG. 2, according to the present method, the initial frame vector is received in step 206 and the initial location of the target object is established in step 212. However, step 218, Eigenbasis initialization is eliminated, thus advantageously allowing tracking of objects for which no description is available a priori. As described below, the Eigenbasis is learned online and updated during the object tracking process.

In this embodiment, dynamic model 224 is implemented as an affine image-warping algorithm that approximates the motion of a target object between two consecutive frames. A state variable $X_t$ describes the affine motion parameters, and thereby the location, of the target at time t. In particular, six parameters model the state transition from $X_{t-1}$ to $X_t$ of a target object being tracked. Let $X_t=(x_t,y_t,\theta_t,s_t,\alpha_t,\phi_t)$ where $x_t$, $y_t$, $\theta_t$, $s_t$, $\alpha_t$, $\phi_t$, denote x-y translation, rotation angle, scale, aspect ratio, and skew direction at time t. Each parameter in $X_t$ is modeled independently by a Gaussian distribution around its counterpart in $X_{t-1}$. That is, $$p(X_t|X_{t-1})=N(X_t;X_{t-1},\Psi)$$

where Ψ is a diagonal covariance matrix whose elements are the corresponding variances of affine parameters, i.e., $\sigma_x^2$, $\sigma_y^2$, $\sigma_\theta^2$, $\sigma_s^2$, $\sigma_\alpha^2$, $\sigma_\phi^2$.

Figure 6:
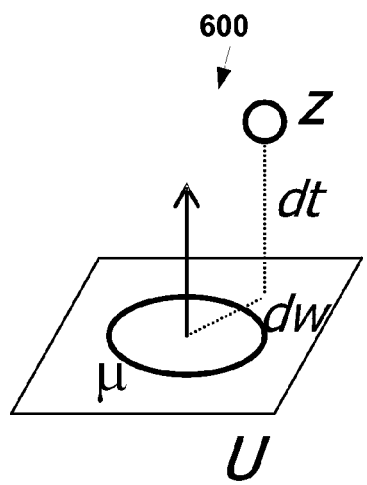
FIG. 6 illustrates a concept of the distance-to-mean observation model according to one embodiment of the present invention.

According to this embodiment, observation model 230 employs a probabilistic interpretation of principal component analysis. A description of this is in M. E. Tipping and C. M. Bishop, "Probabilistic principal component analysis," Journal of the Royal Statistical Society, Series B, 61(3), 1999, which is incorporated by reference herein in its entirety. Given a target object predicated by $X_t$, this model assumes that the observed image $I_t$ was generated from a subspace spanned by U and centered at μ, as depicted in FIG. 6. The probability that a sample of the target object was generated from the subspace is inversely proportional to the distance d from the sample to the reference point, i.e., center, of the subspace μ. This distance can be decomposed into the distance-to-subspace $d_t$ and the distance-within-subspace $d_w$ from the projected sample to the subspace center. This distance formulation is based on an orthonormal subspace and its complement space, and is similar in spirit to the description given in B. Moghaddam and A. Pentland, "Probabilistic visual learning for object recognition," IEEE Transactions an Pattern Analysis and Machine Intelligence, 19(7), 1997, which is incorporated by reference herein in its entirety.

The probability that a sample was generated from subspace U, $p_{d_t}(I_t|X_t)$, is governed by a Gaussian distribution:

$$p_{d_t}(I_t|X_t)=N(I_t;\mu,UU^T+\epsilon I)$$

where I is an identity matrix, μ is the mean, and εI corresponds to the additive Gaussian noise in the observation process. It can be shown that the negative exponential distance from $I_t$ to the subspace spanned by U, i.e., $\exp(-\|(I_t-\mu)-UU^T(I_t-\mu)\|^2)$, is proportional to $p_{d_t}(I_t|X_t)=N(I_t;\mu,UU^T+\epsilon I)$ as $\epsilon\to 0$, as explained in Roweis, which was cited above Within a subspace, the likelihood of the projected sample can be modeled by the Mahalanobis distance from the mean as follows:

$$p_{d_t}(I_t|X_t)=N(I_t;\mu,U\Sigma^{-2}U^T)$$

where μ is the center of the subspace and Σ is the matrix of singular values corresponding to the columns of U.

Combining the above, the likelihood of a sample being generated from the subspace is governed by $$p(I_t|X_t)=p_{d_t}(I_t|X_t)p_{d_w}(I_t|X_t)=N(I_t;\mu,UU^T+\epsilon I)N(I_t;\mu,U\Sigma^{-2}U^T) \quad (3)$$

Given a drawn sample $X_t$ and the corresponding image region $I_t$, the observation model of this embodiment computes $p(I_t|X_t)$ using (3). To minimize the effects of noisy pixels, the robust error norm $$\rho(x,\sigma)=\frac{x^2}{\sigma^2+x^2}$$

is used instead of the Euclidean norm $d(x)=\|x\|^2$, to ignore the "outlier" pixels, e.g., the pixels that are not likely to appear inside the target region given the current Eigenspace. A description of this is in M. J. Black and A. D. Jepson, "Eigentracking: Robust matching and tracking of articulated objects using view-based representation," Proceedings of European Conference on Computer Vision, 1996, which is incorporated by reference herein in its entirety. A method similar to that used in Black and Jepson is applied in order to compute $d_t$ and $d_w$. This robust error norm is helpful especially when a rectangular region is used to enclose the target, which region inevitably contains some "noisy" background pixels.

Again referring to FIG. 2, inference model 236 is next applied. According to this embodiment, given a set of observed images $I_t=\{I_1,\ldots,I_t\}$, the value of the hidden state variable $X_t$ is estimated. Using Bayes' theorem, $$p(X_t|I_t) \propto p(I_t|X_t) \int p(X_t|X_{t-1}) \cdot p(X_{t-1}|I_{t-1}) dX_{t-1}$$

The tracking process is governed by the observation model $p(I_t|X_t)$, where the likelihood of $X_t$ observing $I_t$, and the dynamical model between two states $p(X_t|X_{t-1})$ is estimated. The Condensation algorithm, based on factored sampling, approximates an arbitrary distribution of observations with a stochastically generated set of weighted samples. A description of this is in M. Isard and A. Blake, "Contour tracking by stochastic propagation of conditional density," Proceedings of the Fourth European Conference on Computer Vision, Volume 2, 1996, which is incorporated by reference herein in its entirety. According to this embodiment, the inference model uses a variant of the Condensation algorithm to model the distribution over the object's location, as it evolves over time. In other words, this embodiment is a Bayesian approach that integrates the information over time.

Referring again to FIG. 2, the Eigenbasis is next updated in step 242. In this embodiment, variations in the mean are accommodated as successive frames arrive. Although conventional methods may accomplish this, they only accommodate one datum per update, and provide only approximate results. Advantageously, this embodiment handles multiple data at each Eigenbasis update, and renders exact solutions. A description of this is in P. Hall, D. Marshall, and R. Martin, "Incremental Eigenanalysis for classification," Proceedings of British Machine Vision Conference, 1998, which is incorporated by reference herein in its entirety. Given a sequence of d-dimensional image vectors $I_i$, let $$\mathcal{A}_p = \{I_1, I_2, \ldots, I_n\}, \mathcal{A}_q = \{I_{n+1}, I_{n+2}, \ldots, I_{n+m}\}, \text{ and}$$
$$\mathcal{A}_r = (\mathcal{A}_p | \mathcal{A}_q).$$

Given the mean $\bar{I}_p$ and the SVD of existing data $\mathcal{A}_p$, i.e., $U_p \Sigma_p V_p^T$, and given the counterparts for new data $\mathcal{A}_q$, the mean $\bar{I}_r$ and the SVD of $\mathcal{A}_r$, i.e., $U_r \Sigma_r V_r^T$, are computed easily by extending the method of the first embodiment as follows:

1. Compute $$\bar{I}_r = \frac{n}{n+m}\bar{I}_p + \frac{m}{n+m}\bar{I}_q, \text{ and } \tilde{E} = \left(\mathcal{A}_q - \bar{I}_r 1_{(1 \times m)} \middle| \sqrt{\frac{nm}{n+m}}(\bar{I}_p - \bar{I}_q)\right).$$

2. Compute R-SVD with $U_p \Sigma_p V_p^T$ and $\tilde{E}$ to obtain $U_r \Sigma_r V_r^T$.

In many visual tracking applications, the low dimensional approximation of image data can be further exploited by putting larger weights on more recent observations, or equivalently down weighting the contributions of previous observations. For example, as the appearance of a target object gradually changes, more weight may be placed on recent observations in updating the Eigenbasis, since recent observations are more likely to resemble the current appearance of the target. A forgetting factor $f$ can be used under this premise as suggested in Levy and Lindenbaum, which was cited above, i.e., $A' = (fA|E) = (U(f\Sigma)V|E)$ where A and A' are original and weighted data matrices, respectively.

Figure 7:
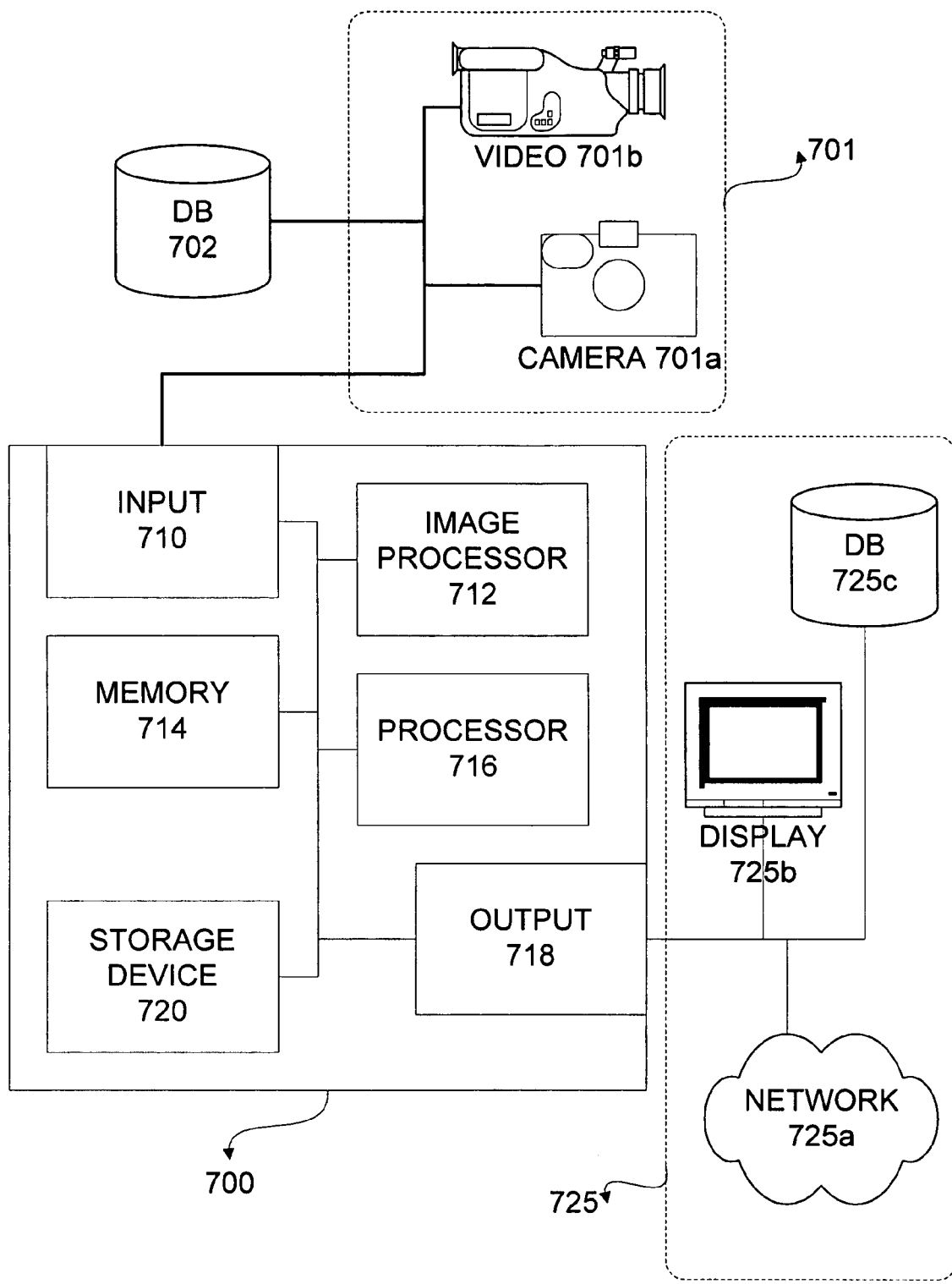
FIG. 7 shows a computer-based system according to one embodiment of the present invention.

Now referring to FIG. 7, a system according to one embodiment of the present invention is shown. Computer system 700 comprises an input module 710, a memory device 714, a processor 716, and an output module 718. In an alternative embodiment, an image processor 712 can be part of the main processor 716 or a dedicated device to pre-format digital images to a preferred image format. Similarly, memory device 714 may be a standalone memory device, (e.g., a random access memory chip, flash memory, or the like), or an on-chip memory with the processor 716 (e.g., cache memory). Likewise, computer system 700 can be a stand-alone system, such as, a server, a personal computer, or the like. Alternatively, computer system 700 can be part of a larger system such as, for example, a robot having a vision system (e.g., ASIMO advanced humanoid robot, of Honda Motor Co., Ltd., Tokyo, Japan), a security system (e.g., airport security system), or the like.

According to this embodiment, computer system 700 comprises an input module 710 to receive the digital images I. The digital images, I, may be received directly from an imaging device 701, for example, a digital camera 701a (e.g., robotic eyes), a video system 701b (e.g., closed circuit television), image scanner, or the like. Alternatively, the input module 710 may be a network interface to receive digital images from another network system, for example, an image database, another vision system, Internet servers, or the like. The network interface may be a wired interface, such as, a USB, RS-232 serial port, Ethernet card, or the like, or may be a wireless interface module, such as, a wireless device configured to communicate using a wireless protocol, e.g., Bluetooth, WiFi, IEEE 802.11, or the like.

An optional image processor 712 may be part of the processor 716 or a dedicated component of the system 700. The image processor 712 could be used to pre-process the digital images I received through the input module 710 to convert the digital images, I, to the preferred format on which the processor 716 operates. For example, if the digital images, I, received through the input module 710 come from a digital camera 710a in a JPEG format and the processor is configured to operate on raster image data, image processor 712 can be used to convert from JPEG to raster image data.

The digital images, I, once in the preferred image format if an image processor 712 is used, are stored in the memory device 714 to be processed by processor 716. Processor 716 applies a set of instructions that when executed perform one or more of the methods according to the present invention, e.g., dynamic model, Eigenbasis update, and the like. While executing the set of instructions, processor 716 accesses memory device 714 to perform the operations according to methods of the present invention on the image data stored therein.

Processor 716 tracks the location of the target object within the input images, I, and outputs indications of the tracked object's identity and location through the output module 718 to an external device 725 (e.g., a database 725a, a network element or server 725b, a display device 725c, or the like). Like the input module 710, output module 718 can be wired or wireless. Output module 718 may be a storage drive interface, (e.g., hard-drive or optical drive driver), a network interface device (e.g., an Ethernet interface card, wireless network card, or the like), or a display driver (e.g., a graphics card, or the like), or any other such device for outputting the target object identification and/or location.

To evaluate the performance of the image tracking algorithm, videos were recorded in indoor and outdoor environments where the target objects changed pose in different lighting conditions. Each video comprises a series of 320× 240 pixel gray-scale images and was recorded at 15 frames per second. For the Eigenspace representation, each target image region was resized to a 32×32 patch, and the number of eigenvectors used in all experiments was set to 16, though fewer eigenvectors may also work well. The tracking algorithm was implemented in MATLAB with MEX, and runs at 4 frames per second on a standard computer with 200 possible particle locations.

Figure 8:
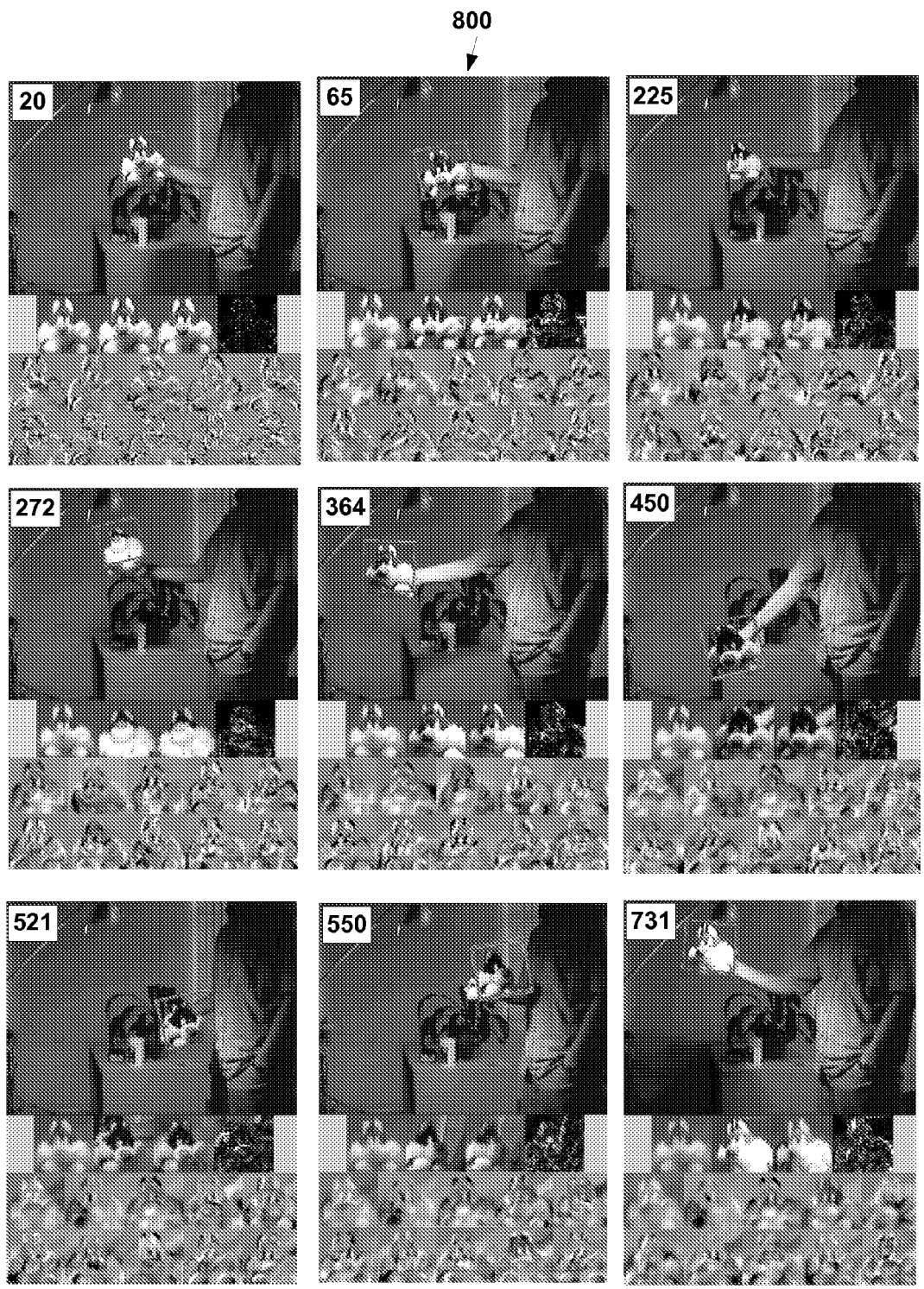
FIG. 8 shows the results of an experimental application of one embodiment of the present invention.

FIG. 8 shows nine panels of excerpted information for a sequence containing an animal doll moving in different pose, scale, and lighting conditions. Within each panel, the topmost image is the captured frame. The frame number is denoted on the upper left corner, and the superimposed rectangles represent the estimated location of the target object. The images in the second row of each panel show the current sample mean, tracked image region, reconstructed image based on the mean and Eigenbasis, and the reconstruction error respectively. The third and forth rows show the ten largest Eigenvectors. All Eigenbases were constructed automatically without resort to training and were constantly updated to model the target object as its appearance changed. Despite significant camera motion, low frame rate, large pose changes, cluttered background and lighting variation, the tracking algorithm remained stably locked on the target. Also, despite the presence of noisy background pixels within the rectangular sample window, the algorithm faithfully modeled the appearance of the target, as shown in the Eigenbases and reconstructed images.

Advantages of the present invention include the ability to efficiently, robustly and stably track an object within a motion video based upon a method that learns and adapts to intrinsic as well as to extrinsic changes. The tracking may be aided by one or more initial training images, but is nonetheless capable of execution where no training images are available. In addition to object tracking, the invention provides object recognition. Experimental confirmation demonstrates that the method of the invention is able to track objects well in real time under large lighting, pose and scale variation.

Upon reading this disclosure, those of skill in the art will appreciate still additional alternative structural and functional designs for a method and apparatus for visual tracking of objects through the disclosed principles of the present invention. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A computer-based method for tracking a location of an object within two or more digital images of a set of digital images, the method comprising the steps of:
   receiving a first image vector representing a first image within the set of digital images;
   determining the location of the object from said first image vector,
   applying a dynamic model to said first image vector to determine a possible motion of the object between said first image vector and a successive image vector representing a second image within the set of digital images;
   applying an observation model to said first image vector to determine a most likely location of the object within said successive image vector from a set of possible locations of the object within said successive image vector;
   applying an inference model to said dynamic model and to said observation model to predict said most likely location of the object; and
   updating an Eigenbasis representing an image space of the two or more digital images.

2. The method of claim 1, wherein said dynamic model represents linear translation, rotation, and scaling according to an affine warping.

3. The method of claim 1, wherein said observation model comprises a probabilistic principal components distribution and represents a normal component of a distance between observations and said Eigenbasis.

4. The method of claim 1, wherein said inference model comprises a sampling method that operates on successive pairs of the digital images of the set of digital images.

5. The method of claim 1, wherein said updating an Eigenbasis comprises recursive singular value decomposition and application of a sequential Karhunen-Loeve algorithm.

6. The method of claim 1, wherein said dynamic model represents linear translation, rotation, scaling, aspect ratio and skew according to an affine warping.

7. The method of claim 1, wherein said observation model comprises a probabilistic principal components distribution and represents orthonormal components of a distance between observations and said Eigenbasis.

8. The method of claim 1, wherein said inference model operates over a sliding window comprising a selectable number of successive of the digital images of the set of digital images.

9. The method of claim 1, wherein said updating an Eigenbasis comprises recursive singular value decomposition and application of a sequential Karhunen-Loeve algorithm and accounts for variations in the sample mean.

10. The method of claim 1, further comprising the step of constructing an initial Eigenbasis representing said image space of the two or more digital images.

11. The method of claim 10, wherein said dynamic model represents linear translation, rotation, and scaling according to an affine warping.

12. The method of claim 10, wherein said observation model comprises a probabilistic principal components distribution and represents a normal component of a distance between observations and said Eigenbasis.

13. The method of claim 10, wherein said inference model comprises a simple sampling method that operates on successive pairs of the digital images of the set of digital images.

14. The method of claim 10, wherein said updating an Eigenbasis comprises recursive singular value decomposition and application of a sequential Karhunen-Loeve algorithm.

15. The method of claim 10, wherein said dynamic model represents linear translation, rotation, scaling, aspect ratio and skew according to an affine warping.

16. The method of claim 10, wherein said observation model comprises a probabilistic principal components distribution and represents orthonormal components of a distance between observations and said Eigenbasis.

17. The method of claim 10, wherein said inference model operates over a sliding window comprising a selectable number of successive of the digital images of the set of digital images.

18. The method of claim 10, wherein said updating an Eigenbasis comprises recursive singular value decomposition and application of a sequential Karhunen-Loeve algorithm and accounts for variations in the sample mean.

19. A computer system for tracking the location of an object within two or more digital images of a set of digital images, the system comprising:
   means for receiving a first image vector representing a first image within the set of digital images;
   means for determining the location of the object from said first image vector;

means for applying a dynamic model to said first image vector to determine a possible motion of the object between said first image vector and a successive image vector representing a second image within the set of digital images;

means for applying an observation model to said first image vector to determine a most likely location of the object within said successive image vector from a set of possible locations of the object within said successive image vector;

means for applying an inference model to said dynamic model and to said observation model to predict said most likely location of the object; and means for updating an Eigenbasis representing an image space of the two or more digital images.

20. The system of claim 19, further comprising means for constructing an initial Eigenbasis representing said image space of the two or more digital images.

21. An image processing computer system for tracking the location of an object within a set of digital images, comprising:

an input module for receiving data representative of the set of digital images;

a memory device coupled to said input module for storing said data representative of the set of digital images;

a processor coupled to said memory device for iteratively retrieving data representative of two or more digital images of the set of digital images, said processor configured to:

apply a dynamic model to a first digital image of said two or more digital images to determine a possible motion of the object between said first digital image of said two or more digital images and a successive digital image of said two or more digital images;

apply an observation model to said first digital image to determine a most likely location of the object within said successive digital image from a set of possible locations of the object within said successive digital image;

apply an inference model to said dynamic model and to said observation model to predict said most likely location of the object within said successive digital image; and update an Eigenbasis representing an image space of said two or more digital images.

* * * * *